(12) United States Patent
Clayton

(10) Patent No.: US 8,990,158 B2
(45) Date of Patent: Mar. 24, 2015

(54) COPY OF REPLICATION STATUS FOR SYNCHRONIZATION

(71) Applicant: International Business Machines Corporation, Armonk, NY (US)

(72) Inventor: Nicolas M. Clayton, Warrington (GB)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 13/734,909

(22) Filed: Jan. 4, 2013

(65) Prior Publication Data

US 2014/0195483 A1 Jul. 10, 2014

(51) Int. Cl.
*G06F 17/30* (2006.01)
*G06F 11/20* (2006.01)

(52) U.S. Cl.
CPC .................. *G06F 11/2074* (2013.01)
USPC ......................... 707/634; 707/622

(58) Field of Classification Search
CPC ...................... G06F 11/1662; H04L 29/08306; H04L 29/0854
USPC ......... 707/610, 616, 619, 622, 634, 635, 637, 707/638, 639
See application file for complete search history.

(56) References Cited

U.S. PATENT DOCUMENTS

| | | | |
|---|---|---|---|
| 7,721,056 B2 | 5/2010 | Wake | |
| 8,028,192 B1 | 9/2011 | Kekre et al. | |
| 8,209,282 B2 * | 6/2012 | Kern et al. | 707/610 |
| 2010/0011095 A1 | 1/2010 | Takamoto et al. | |
| 2010/0223232 A1 * | 9/2010 | Wakefield | 707/634 |
| 2014/0075110 A1 * | 3/2014 | Benhase et al. | 711/114 |
| 2014/0108857 A1 * | 4/2014 | Brown et al. | 714/6.23 |

* cited by examiner

*Primary Examiner* — Greta Robinson
(74) *Attorney, Agent, or Firm* — Kunzler Law Group

(57) ABSTRACT

For synchronizing replication status, a copy module continuously replicates data from a first device designated with a device status of primary to a second device designated with a device status of secondary. A first peer-to-peer remote copy (PPRC) relationship is established between the first and second devices. The first and second devices store replication information comprising a bitmap with a replication status for each data block of the first device. The copy module further copies an instant point-in-time copy of the data from the second device to a copy device. In addition, the copy module copies the replication information from the second device to the copy device and links the replication information of the second device and copy devices.

20 Claims, 10 Drawing Sheets

COPY OF REPLICATION STATUS FOR SYNCHRONIZATION

BACKGROUND

1. Field

The subject matter disclosed herein relates to replication status and more particularly relates to the copy of replication status for the purpose of synchronization.

2. Description of the Related Art

Instant copies are often made of data. A workload may be run from the instant copy as needed.

BRIEF SUMMARY

An apparatus for copying replication status is disclosed. The apparatus includes a computer readable storage medium and a copy module. The computer readable storage medium stores program code executable by a processor. The copy module continuously replicates data from a first device designated with a device status of primary to a second device designated with a device status of secondary. A first peer-to-peer remote copy (PPRC) relationship is established between the first and second devices. The first and second devices store replication information comprising a bitmap with a replication status for each data block of the first device. The copy module further copies an instant point-in-time copy of the data from the second device to a copy device. In addition, the copy module copies the replication information from the second device to the copy device and links the replication information of the second device and copy devices. Methods and a computer program product also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
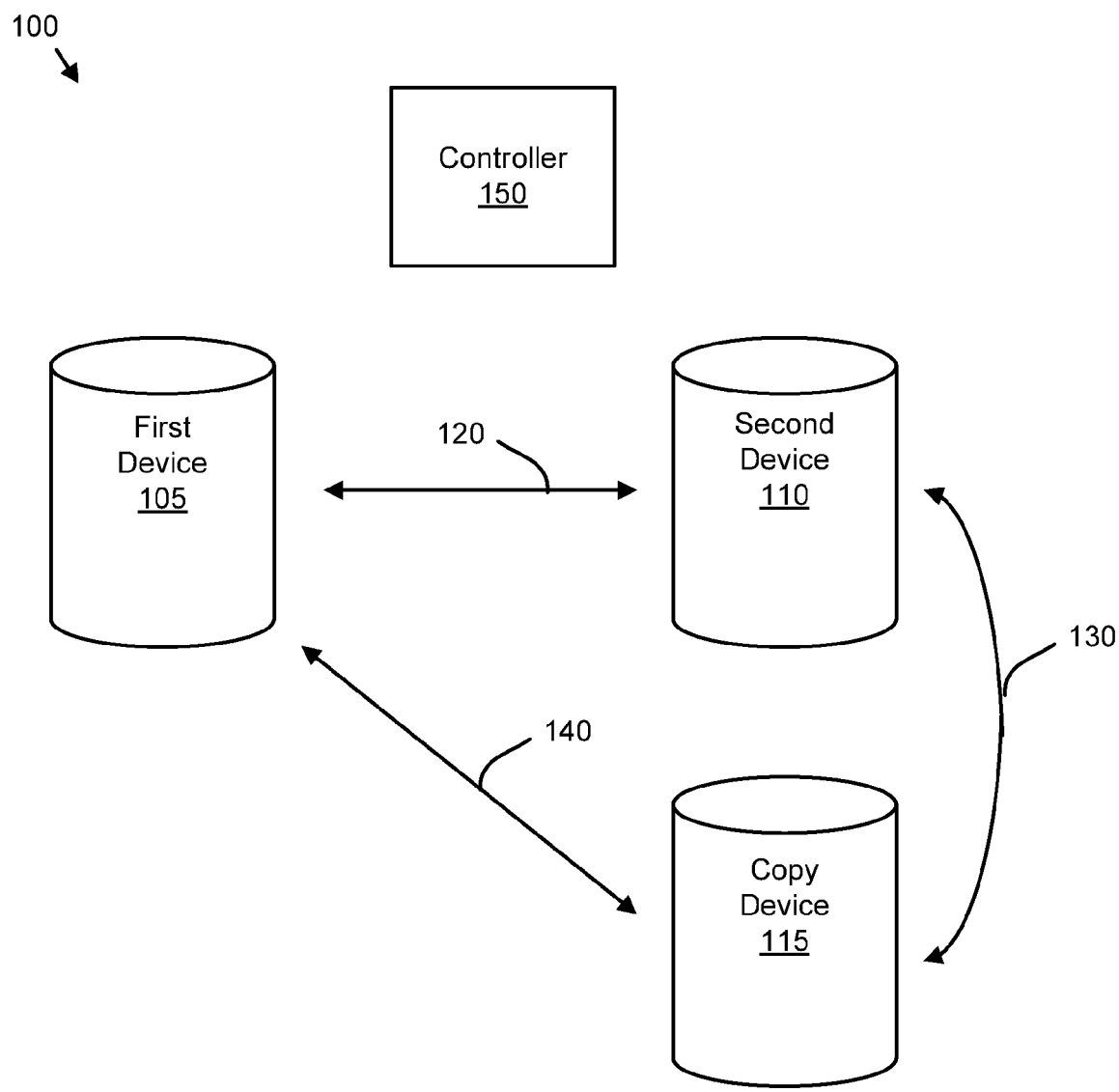
FIG. 1 is a schematic diagram illustrating one embodiment of a storage system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1 is a schematic diagram illustrating one embodiment of a storage system 100. The storage system 100 comprises a plurality of storage devices including a first device 105, a second device 110, and the copy device 115. The storage system 100 may also include a controller 150. The storage devices 105, 110, 115 may be virtual devices, physical devices, and combinations thereof. The physical devices may be hard disk drives, optical storage devices, micromechanical storage devices, holographic storage devices, semiconductor storage devices, or combinations thereof. The virtual devices may comprise portions of one or more physical devices.

The first device 105 may be designated with a device status of primary. Data may be stored to the first device 105 and retrieved from the first device 105 as is well known to those of skill in the art. In one embodiment, the first device 105 stores data for a network, a data processing center, one or more computer workstations, or combinations thereof. The controller 150 may manage the accessing data in the storage system 100.

To protect the data on the first device 105, the data may be continuously replicated from the first device 105 to the second device 110. The replication process may be a synchronous Metro Mirror replication process, an asynchronous Global Mirror replication process, or the like.

The second device 110 may be designated with a device status of secondary. In one embodiment, a first peer-to-peer remote copy (PPRC) relationship 120 is established between the first device 105 and the second device 110. As a result of the first PPRC relationship 120, replication information may be stored on the first device 105. In addition, the replication information may be stored on the second device 110.

As a result of a fail over command, the second device 115 may be designated with a device status of primary. As a result, the data may be accessed from the second device 115.

To further protect the data, the data on the second device 110 may be copied from the second device 110 to the copy device 115. A FlashCopy or similar point-in-time copy relationship 130 may be established between the second device 110 and the copy device 115. Replication information for the copy relationship 130 may be stored on the second device 110 and/or the copy device 115.

As a result if establishing the copy relationship 130, a second PPRC relationship 140 may be established between the copy device 115 and the first device 105 in a suspended state. Replication information for the second PPRC relationship 140 may be stored on the copy device 115 and/or the second device 105 but not on the first device 105.

The first PPRC relationship 120 may be suspended and have a status of primary in order for the second PPRC relationship 140 to be established. The replication of the data from the first device 105 to the second device 110, the replication of the data from the second device 110 to the copy device 115, and the copying of the replication information from the second device 110 to the copy device 115 may be performed in response to an atomic command.

In one embodiment, both the first PPRC relationship 120 and second PPRC relationship 140 may be maintained if the copy relationship 130 is terminated. By establishing the second PPRC relationship 140, the embodiments described herein further protect the data, and allow the copy device 115 to be designated as primary to perform replication back to the first device 105.

Figure 2:
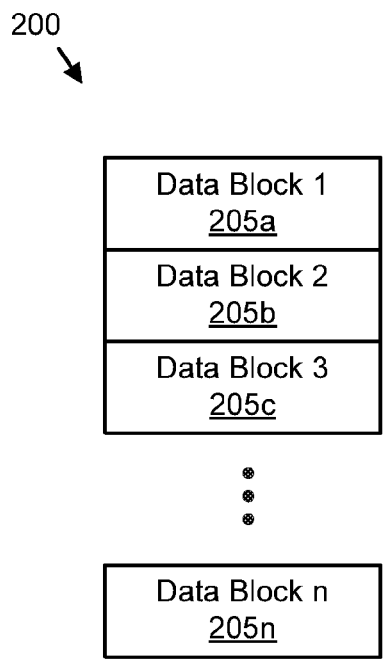
FIG. 2 is a schematic block diagram illustrating one embodiment of data.

FIG. 2 is a schematic block diagram illustrating one embodiment of data 200. The data stored on the first device 105, the second device 110, and the copy device 115 may be the data 200. The data 200 may be embodied in a plurality of data blocks 205. In the depicted embodiment, and data blocks 205 are shown as contiguous. One of skill in the art will recognize that the embodiments may be practiced with any number of data blocks 205, and that the data blocks 205 need not be contiguous.

The data blocks 205 may have a fixed length. Alternatively, the data blocks 205 may have a variable length. The data blocks 205 may be sectors, segments, or the like. In one embodiment, when data is written to the first device 105, a data block 205 such as data block 1 205a may be overwritten. Alternatively, a data block 205 such as data block such as data block 1 205a may be erased and a new data block 205 such as data block 2 205b may be written.

To protect the data 200, changes to the data blocks 205 are continuously replicated from the primary to the secondary. For example, if the first device 105 has a device status of primary and the second device 110 has a device status of secondary, a change to data block 3 205c may be replicated to the second device 110 by copying data block 3 205c to the second device 110. The replication information records changes to the data blocks 205 so these changes may be replicated from the primary to the secondary.

Figure 3:
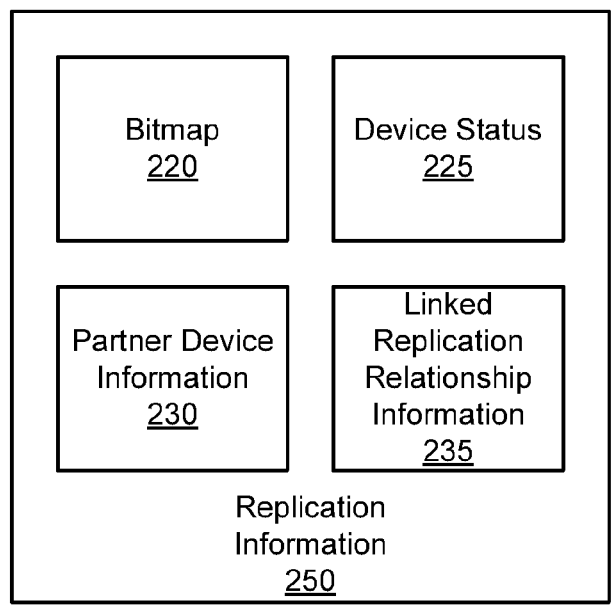
FIG. 3 is a schematic block diagram illustrating one embodiment of replication information.

FIG. 3 is a schematic block diagram illustrating one embodiment of replication information 250. The replication information 250 includes a bitmap 220, device status 225, and partner device information 230 about the other device in the relationship. In addition, the replication information may include linked replication relationship information 235. The bitmap 220 is described in more detail in FIG. 4. The device status 225 may indicate whether a storage device 105, 110, 115 is a primary or a secondary. The primary storage device may be accessed when accessing the storage system 100 while the secondary storage device mirrors the primary storage device. In one embodiment, each storage device 105, 110, 115 stores a copy of the replication information 250 as part of a PPRC relationship. The partner device information 230 contains the identity of the other device in the PPRC relationship. For example, for the first device 105 the first PPRC relationship 120 would contain the identity of the second device 110. The linked replication relationship 235 information contains a pointer to another set of replication information 250.

Figure 4:
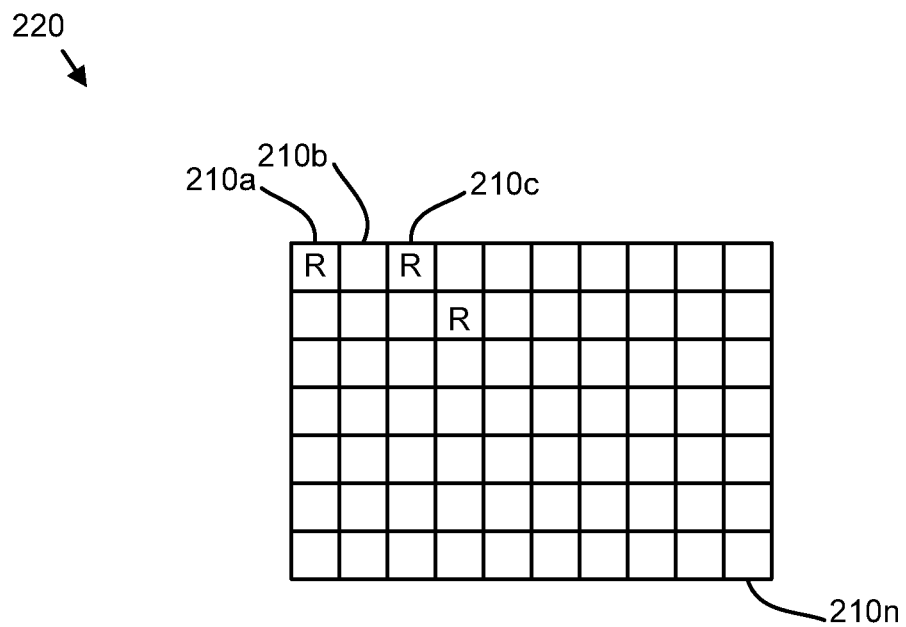
FIG. 4 is a schematic diagram illustrating one embodiment of a replication information bitmap.

FIG. 4 is a schematic diagram illustrating one embodiment of a replication information bitmap 220. The bit map 220 may be embodied in the replication information 250 for each PPRC relationship 120, 140. In one embodiment, the bit map 220 includes a plurality of replication statuses 210. One replication status 210 may correspond to each data block 205. When a data block 205 is changed, a value of the corresponding replication status 210 may be set to indicate that the data block 205 should be replicated to the secondary.

For example, if data block 1 205a is modified, the corresponding replication status 210a in the bit map 220 may be set. Data block 1 205a may then be replicated from the primary to the secondary. After data block 1 205a is replicated, the corresponding fields 210a may be cleared to indicate that the replication is complete.

Figure 5:
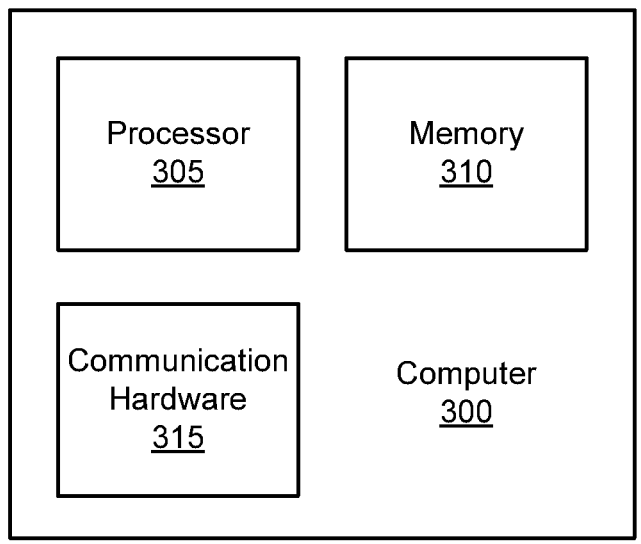
FIG. 5 is a schematic block diagram illustrating one embodiment of a computer.

FIG. 5 is a schematic block diagram illustrating one embodiment of a computer 300. The computer 300 may be the controller 150. Alternatively, the computer 300 may be embodied in one or more of the first device 105, the second device 110, and the copy device 115. The computer 300 includes a processor 305, a memory 310, and communication hardware 315.

The memory 310 may be a computer readable storage medium such as a hard disk drive, a semiconductor storage device, an optical storage device, a micromechanical storage device, or combinations thereof. The memory 310 may store program code. The processor 305 may execute the program code. The communication hardware 315 may communicate with other devices.

Figure 6:
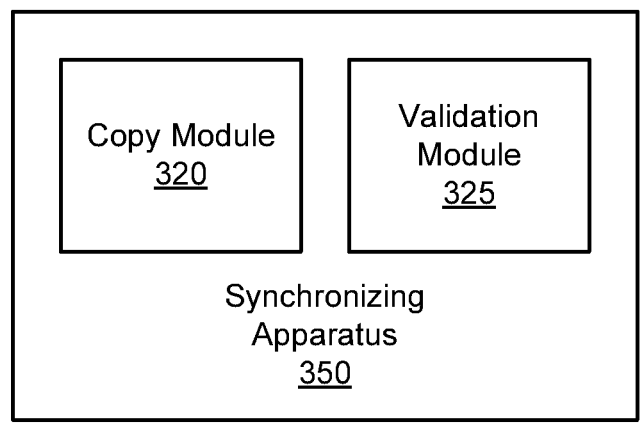
FIG. 6 is a schematic block diagram illustrating one embodiment of a synchronizing apparatus.

FIG. 6 is a schematic block diagram illustrating one embodiment of a synchronizing apparatus 350. The synchronizing apparatus 350 may be embodied in the controller 150. The synchronizing apparatus 350 includes a copy module 320 and a validation module 325. The copy module 320 and the validation module 325 may be embodied in a computer readable storage medium storing program code. The program code when executed by the processor 305 may perform the functions of the synchronizing apparatus 350.

The copy module 320 continuously replicates data 200 from the first device 105 when the first device 105 is designated with a device status 225 of primary to the second device 110 when the second device 110 is designated with a device status 225 of secondary. The copy module 320 may establish the first PPRC relationship 120 between the first device 105 and the second device 110. The copy module 320 may copy an instant point-in-time copy of the data 200 from the second device 110 to the copy device 115. In addition, the copy module 320 may copy the replication information from the second device 110 to the copy device 115. The validation module 325 may validate PPRC relationships, 120, 140 before performing a synchronization using the PPRC relationship replication status 210 of the bitmaps 220 as will be described hereafter.

Figure 7:
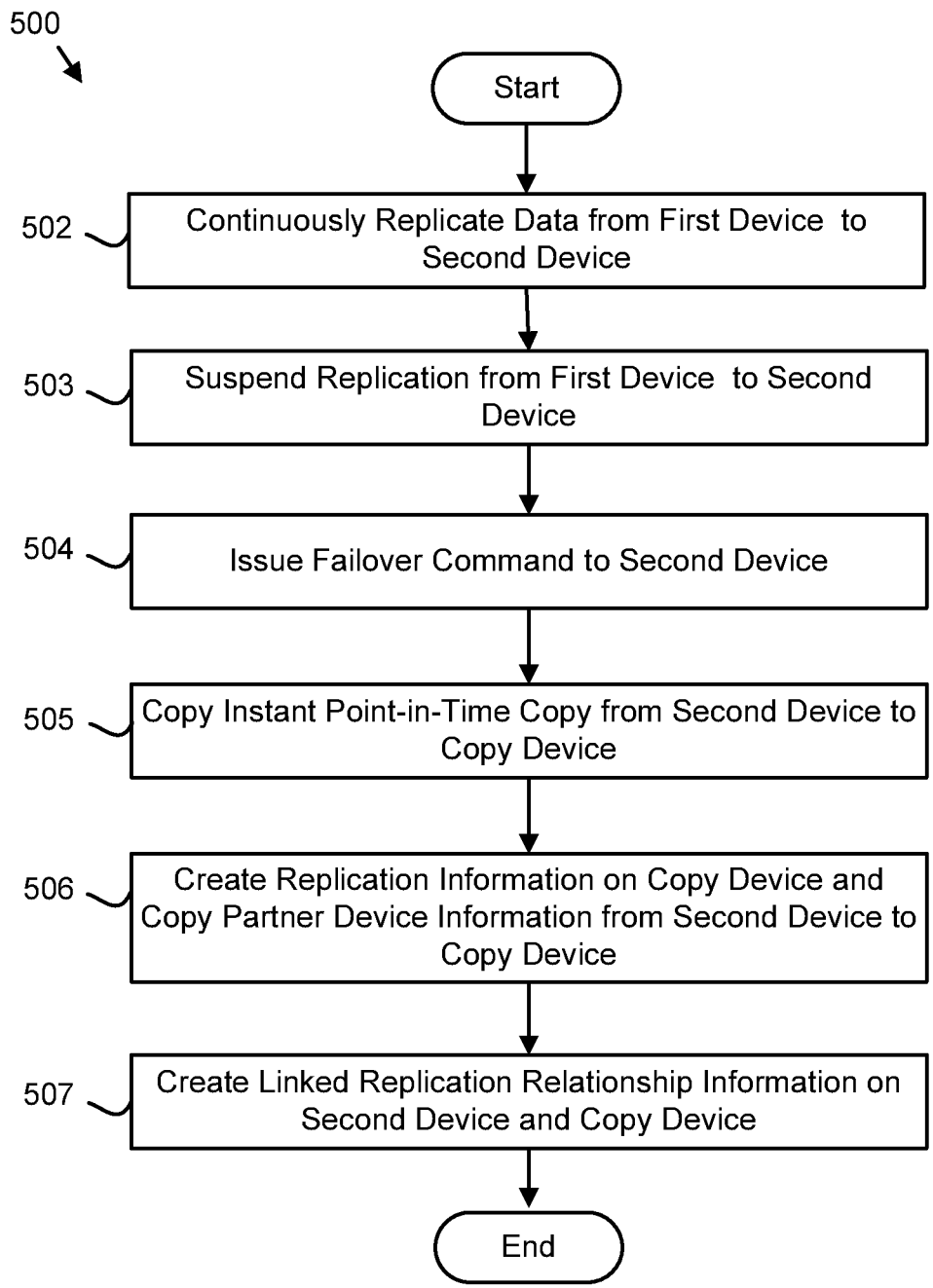
FIG. 7 is a schematic flow chart diagram illustrating one embodiment of a synchronizing method.

FIG. 7 is a schematic flow chart diagram illustrating one embodiment of a replication status copy method 500. The method 500 may perform the functions of the system 100 and the apparatus 350. In one embodiment, the method 500 is performed by a computer readable storage medium such as the memory 310. The computer readable storage medium 310 may store program code that when executed by the processor 305 performs the method 500.

The method 500 starts, and in one embodiment the copy module 320 continuously replicates 502 data 200 from a primary such as the first device 105 to a secondary such as the second device 110. A first PPRC relationship 120 is established between the first device 105 and the second device 110. The first device 105 and the second device 110 store replication information 250 for the first PPRC relationship 120.

In one embodiment, the copy module 320 suspends 503 the replication by placing the first device 105 and the second device 110 in a suspended PPRC relationship 120. In the suspended PPRC relationship 120, changes to the data 200 of the first device 105 are not replicated to the second device 110 but writes are recorded in the bitmap 220. Furthermore a failover command may be issued 504 to the second device 110 so that the device status of the second device 110 is changed from secondary to primary and writes are recorded in the bitmap 220.

The copy module 320 may further copy 505 an instant point-in-time copy of the data 200 from the second device 110 to the copy device 115. In addition, the copy module 320 may create 506 the replication information 250 on the copy device 115 and copy the partner device information 230, bitmap 220 and device status 225 from the second device 110 to the copy device 115. The copy module 320 further creates the linked replication relationship information 235 on both the second device 110 and the copy device 115 linking the replication information 250 of the two PPRC relationships 120, 140 and the method 500 ends.

In one embodiment, the second PPRC relationship 140 is established on the copy device 115 and linked to the first PPRC relationship 120 on the second device 110 by creating linked replication relationship information 235 on the second device 110 and the copy device 115.

By creating the first PPRC relationship 120 between the first device 105 and the second device 110 and the second PPRC relationship 140 on the copy device 115, either the second device 110 or the copy device 115 may serve as a primary storage device if there is a failover from the first device 105.

In one embodiment, the data 200 may be accessed on the second device 110 or the copy device 115 as part of a site switch using the method 500. The first PPRC relationship 120 and/or the second PPRC relationship 140 may be suspended so that a copy of the data 200 does not return to the original primary storage device.

Figure 8:
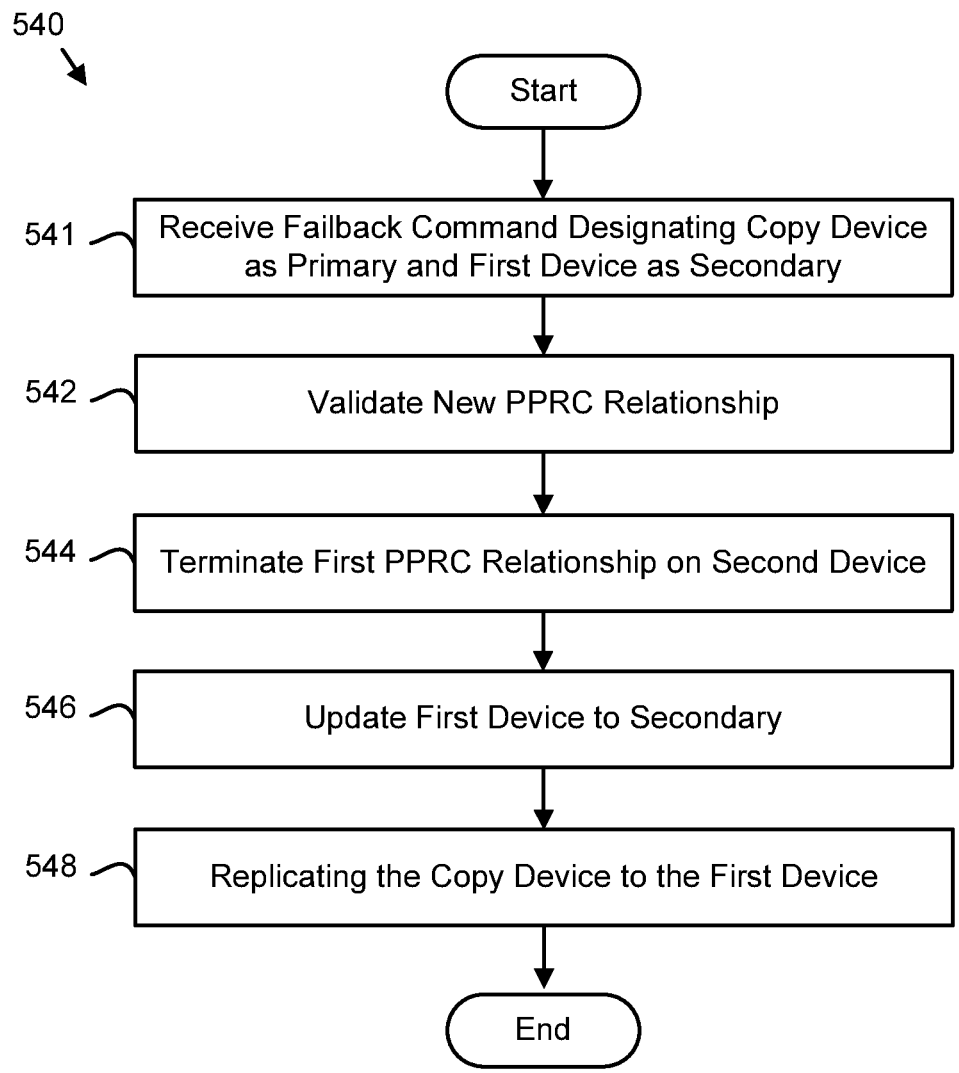
FIG. 8 is a schematic flow chart diagram illustrating one embodiment of a failback method.

FIG. 8 is a schematic flow chart diagram illustrating one embodiment of a failback method 540. The method 540 may perform the functions of the system 100 and the apparatus 350. In one embodiment, the method 540 is performed by a computer readable storage medium such as the memory 310. The computer readable storage medium 310 may store program code that when executed by the processor 305 performs the method 540.

The method 540 starts, and in one embodiment the copy module 320 receives 541 a failback command designating the copy device 115 with a device status 225 of primary and the first device 105 with the device status 225 of secondary. Before the failback command, the first device 105 may have the device status 225 of primary and the copy device 110 may have the device status 225 of primary.

In response to the failback command, the validation module 320 validates 542 a new second PPRC relationship 140 between the copy device 115 and the first device 105 by using the linked replication relationship information 235 of the copy device 115 to compare the partner device information 230 stored on the second device 110 with the identity of the first device 105. Thus the second PPRC relationship 140 may be established without referencing the identity of the copy device 115.

The copy module 320 may further terminate 544 the first PPRC relationship 120 on the second device 110 using the linked replication relationship information 235. In addition, the copy module 320 may update 546 the device status 225 of the first device 105 to secondary. In one embodiment, the copy module 320 updates 546 the device status 225 of the copy device 115 to primary.

The copy module 320 may further replicate 548 the data 200 of the copy device 115 to the first device 105 and the method 540 ends. The copy module 320 may replicate 548 the data 200 by logically ORing the bitmaps 220 of the copy device 115 and the first device 105. The result may be stored in the respective bitmaps 220. Thus each data block 205 with the replication status 210 that indicates replication is required in either the copy device bitmap 220 or the first device bitmap 220 will be replicated 548. The method 540 results in the copy device 115 as primary and the first device 105 as secondary.

Figure 9:
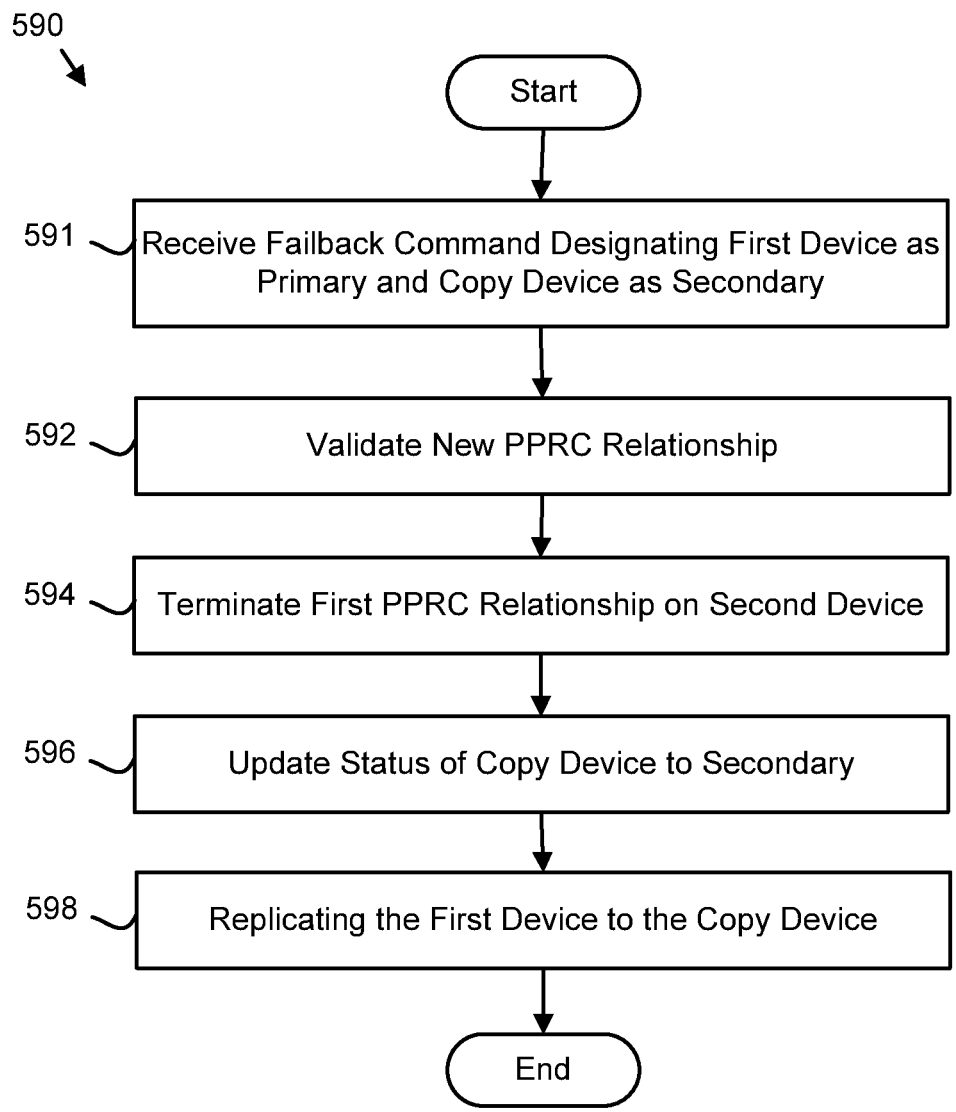
FIG. 9 is a schematic flow chart diagram illustrating one alternate embodiment of a failback method.

FIG. 9 is a schematic flow chart diagram illustrating one alternate embodiment of a failback method 590. The method 590 may perform the functions of the system 100 and the apparatus 350. In one embodiment, the method 590 is performed by a computer readable storage medium such as the memory 310. The computer readable storage medium 310 may store program code that when executed by the processor 305 performs the method 590.

The method 590 starts, and in one embodiment the copy module 320 receives 591 a failback command designating the first device 105 with the device status 225 of primary and the copy device 115 with the device status 225 of secondary. Before the failback command, the device status 225 of the copy device 115 may have the device status 225 of primary and the device status 225 of the first device 105 may be primary.

In response to the failback command, the validation module 320 validates 592 a new second PPRC relationship 140 between the first device 105 and the copy device 115 by comparing the partner device information 230 stored on the first device 105 with the identity of the second device 110 using the linked replication relationship information 235 of the copy device 115. Thus the second PPRC relationship 140 may be established without referencing the identity of the copy device 115.

The copy module 320 may further terminate 594 the first PPRC relationship 120 on the second device 110 using the linked replication relationship information 235 of the copy device 115. In addition, the copy module 320 may update 596 the device status 225 of the copy device 115 to secondary. In one embodiment, the copy module 320 updates 596 the device status 225 of the first device 105 to primary.

The copy module 320 may further replicate 598 the data 200 of the first device 105 to the copy device 115 and the method 590 ends. The copy module 320 may replicate 598 the data 200 by logically ORing the bitmaps 220 of the copy device 115 and the first device 105. The result may be stored in the respective bitmaps 220. Thus each data block 205 with the replication status 210 that indicates replication is required in either the copy device bitmap 220 or the first device bitmap 220 will be replicated 598. The method 590 results in the first device 105 as primary and the copy device 115 as secondary.

Figure 10:
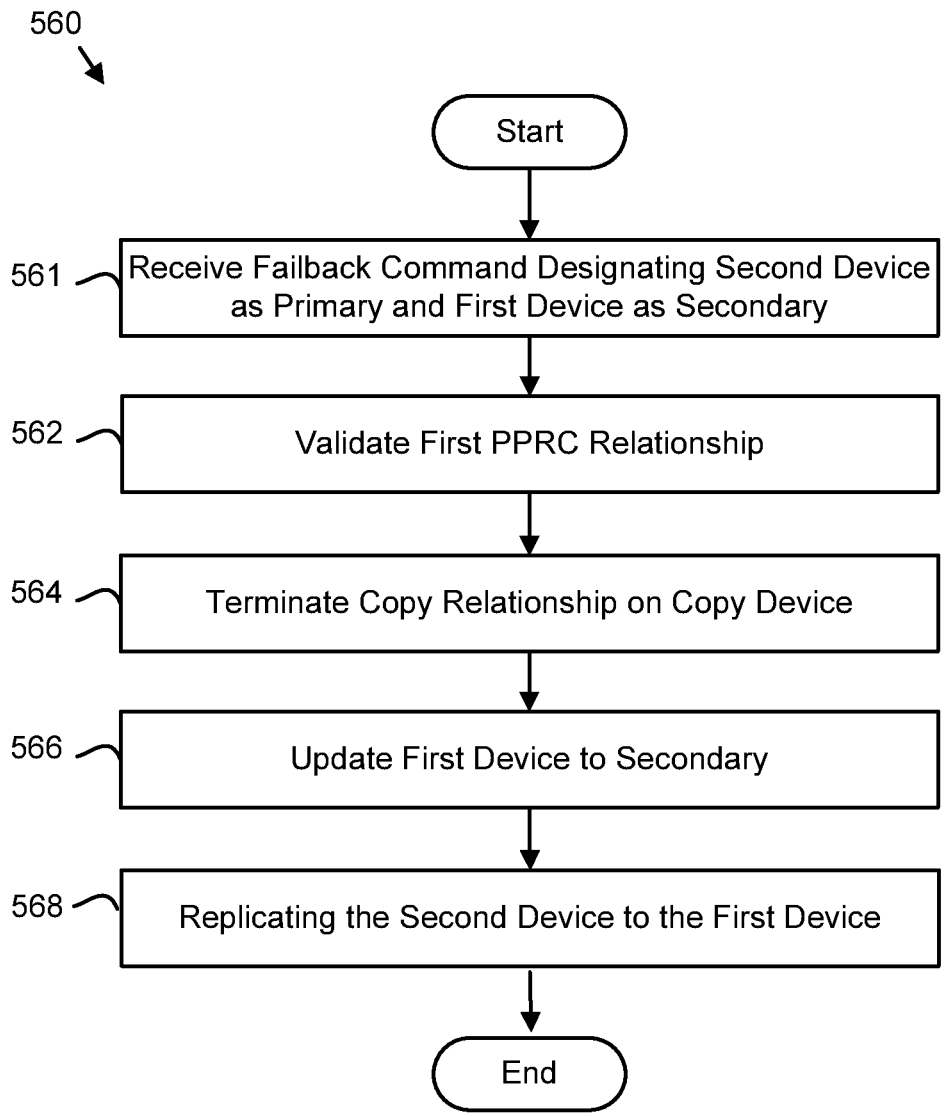
FIG. 10 is a schematic flow chart diagram illustrating one alternate embodiment of a failback method.

FIG. 10 is a schematic flow chart diagram illustrating one alternate embodiment of a failback method 560. The method 560 may perform the functions of the system 100 and the apparatus 350. In one embodiment, the method 560 is performed by a computer readable storage medium such as the memory 310. The computer readable storage medium 310 may store program code that when executed by the processor 305 performs the method 560.

The method 560 starts, and in one embodiment the copy module 320 receives 561 a failback command designating the second device 110 with a device status 225 of primary and the first device 105 with a device status 225 of secondary. Before the failback command, the device status 225 of the first device 105 may be primary and the device status 225 of the second device 110 may be primary.

In response to the failback command, the validation module 320 validates 562 the first PPRC relationship 120 between the first device 105 and the second device 110 using the partner device information 230 stored on the second device 110 to compare with the identity of the first device 105. Thus the first PPRC relationship 120 may be established without referencing the PPRC relationship replication status 210 on the copy device 115.

The copy module 320 may further terminate 564 the second PPRC relationship 140 on the copy device 115 using the linked replication relationship information 235 of the second device 110. In addition, the copy module 320 may update 566 the device status 225 of the first device 105 to secondary. In one embodiment, the copy module 320 updates 566 the device status 225 of the second device 110 to primary.

The copy module 320 may further replicate 568 the data 200 of the second device 110 to the first device 105 and the method 560 ends. The copy module 320 may replicate 568 the data 200 by logically ORing the bitmaps 220 of the second device 110 and the first device 105. The result may be stored in the respective bitmaps 220. Thus each data block 205 with the replication status 210 that indicates replication is required in either the second bitmap 220 or the first device bitmap 220 will be replicated 568. The method 560 results in the second device 110 as primary and the first device 105 as secondary.

Figure 11:
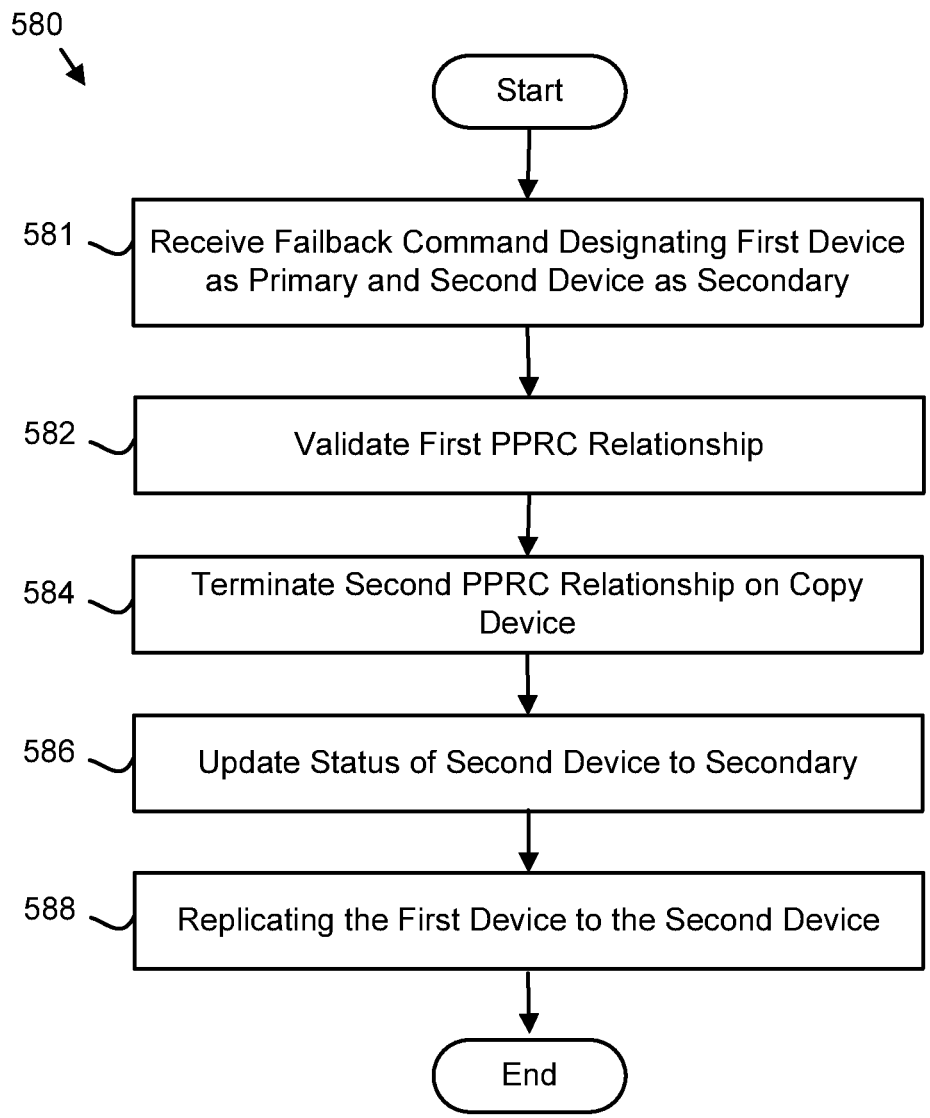
FIG. 11 is a schematic flow chart diagram illustrating one alternate embodiment of a failback method.

FIG. 11 is a schematic flow chart diagram illustrating one alternate embodiment of a failback method 580. The method 580 may perform the functions of the system 100 and the apparatus 350. In one embodiment, the method 580 is performed by a computer readable storage medium such as the memory 310. The computer readable storage medium 310 may store program code that when executed by the processor 305 performs the method 580.

The method 580 starts, and in one embodiment the copy module 320 receives 581 a failback command designating the first device 105 with a device status 225 of primary and the second device 110 with the device status 225 of secondary. Before the failback command, the second device 110 may have the device status 225 of primary and the first device 105 may have the device status 225 of primary.

In response to the failback command, the validation module 320 validates 582 the first PPRC relationship 120 between the first device 105 and the second device 110 by comparing the partner device information 235 stored on the first device 105 with the identity of the second device 110. Thus the first PPRC relationship 120 may be established without referencing the PPRC relationship replication status 210 on the copy device 115.

The copy module 320 may further terminate 584 the second PPRC relationship 140 on the copy device 115 using the linked replication relationship information 235 of the second device 110. In addition, the copy module 320 may update 586 the device status 225 of the second device 110 to secondary. In one embodiment, the copy module 320 updates 586 the device status 225 of the first device 105 to primary.

The copy module 320 may further replicate 588 the data 200 of the first device 105 to the second device 110 and the method 540 ends. The copy module 320 may replicate the data 200 by logically ORing the bitmaps 220 of the second device 110 and the first device 105. The result may be stored in the respective bitmaps 220. Thus each data block 205 with the replication status 210 that indicates replication is required in either the second device bitmap 220 or the first device bitmap 220 will be replicated 588. The method 580 results in the first device 105 as primary and the second device 110 as secondary.

Figure 12:
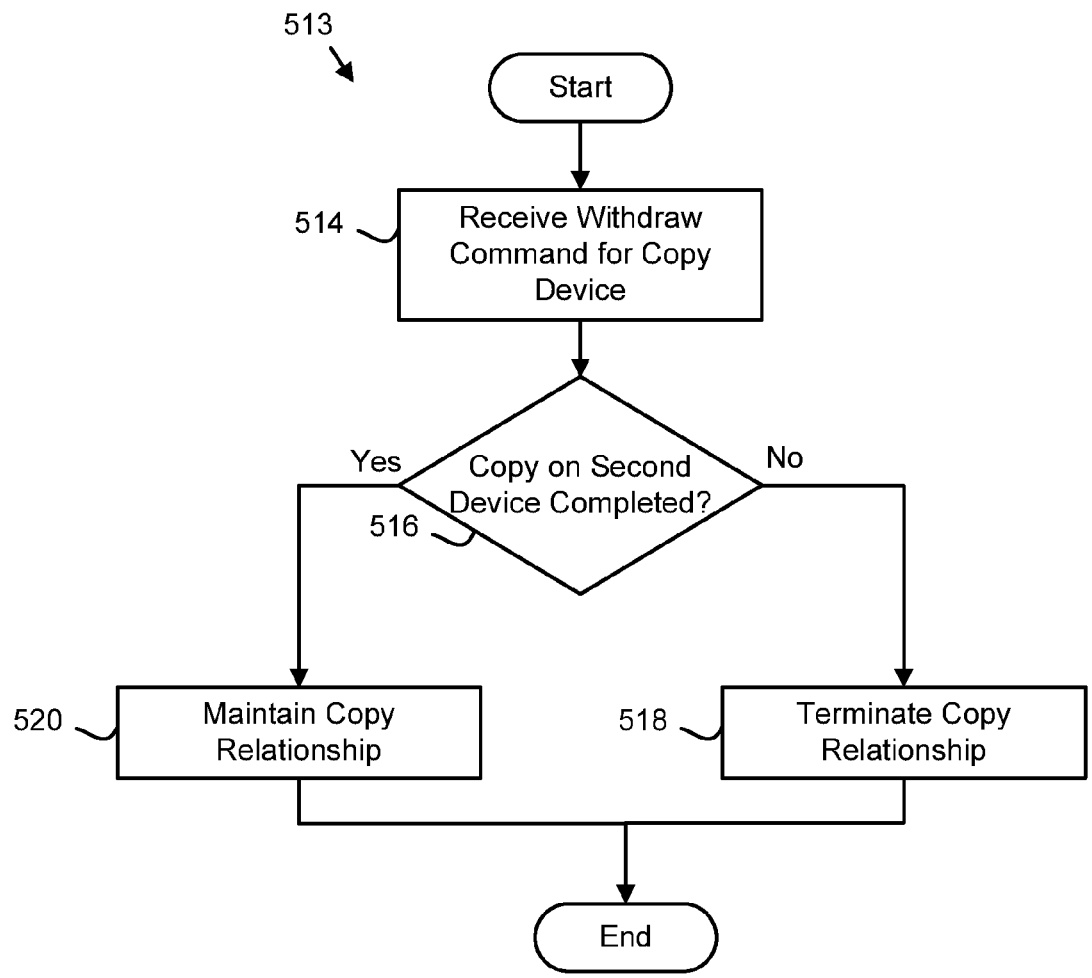
FIG. 12 is a schematic flow chart diagram illustrating one embodiment of a withdraw method.

FIG. 12 is a schematic flow chart diagram illustrating one embodiment of a withdraw method 513. The method 513 may perform the functions of the system 100 and the apparatus 350. In one embodiment, the method 513 is performed by a computer readable storage medium such as the memory 310. The computer readable storage medium 310 may store program code that when executed by the processor 305 performs the method 513.

The method 513 starts, and in one embodiment the control module 320 receives 514 a withdraw command for the copy relationship 130 with the copy device 115. The withdraw command may be received following a failover command to the second device 110 and the establishment of the copy relationship 130 such that both the first PPRC relationship 120 on the second device 110 and the second PPRC relationship 140 on the copy device 115 exist at the time the command is issued.

In response to receiving 514 the withdraw command, the control module 320 may determine 516 if the copy of the data 200 on the second device 110 is completed by the withdraw command. If the copy of the data 200 on the second device 110 is not completed by the withdraw command, the control module 320 may terminate 518 the second PPRC relationship 140 using the linked replication relationship information 235 of the second device 110 and the method 513 ends. If the copy of the data 200 on the second device 110 is completed by the withdraw command, the control module 320 may maintain 520 the second PPRC relationship 140 and the method 513 ends.

Figure 13:
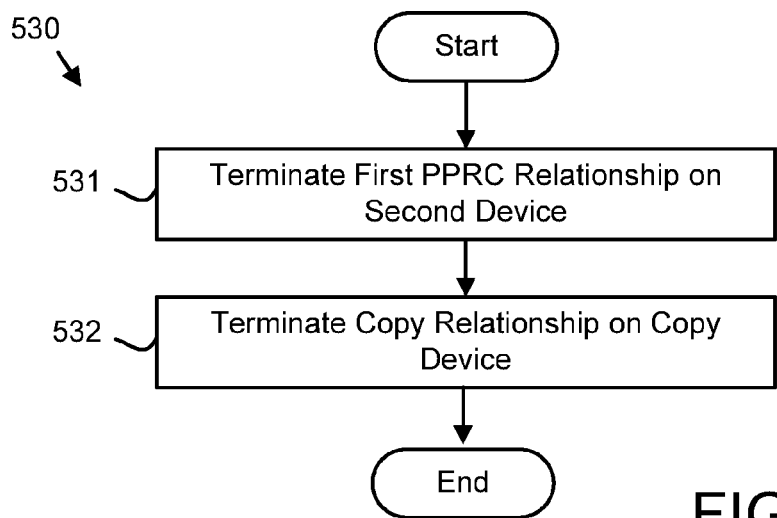
FIG. 13 is a schematic flow chart diagram illustrating one embodiment of a terminate method.

FIG. 13 is a schematic flow chart diagram illustrating one embodiment of a terminate method 530. The method 530 may perform the functions of the system 100 and the apparatus 350. In one embodiment, the method 530 is performed by a computer readable storage medium such as the memory 310. The computer readable storage medium 310 may store program code that when executed by the processor 305 performs the method 530.

The method 530 starts, and in one embodiment the first PPRC relationship 120 on the second device 110 is terminated 531. The termination 531 may be in response to a termination command. In response to terminating 531 the first PPRC relationship 120, the second PPRC relationship 140 on the copy device 115 may be terminated 532 using the linked replication relationship information 235 of the second device 110 and the method 530 ends. The functionality of the embodiments described herein may be extended to any number of storage devices and any number of PPRC and point-in-time copy relationships.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a computer readable storage medium storing program code executable by a processor, the program code comprising:
   a copy module continuously replicating data from a first device designated with a device status of primary to a second device designated with a device status of secondary, wherein a first peer-to-peer remote copy (PPRC) relationship is established between the first and second devices, the first and second devices storing replication information comprising a bitmap with a replication status for each data block of the first device, copying an instant point-in-time copy of the data from the second device to a copy device, copying the replication information from the second device to the copy device, and creating a link between the replication information of the second device and the replication information of the copy device;
   a validation module, in response to a failback command designating the copy device with a device status of primary and the first device with the device status of secondary, validating a new PPRC relationship by comparing the PPRC relationship replication status stored on the second device with the PPRC relationship replication status stored on the first device; and
   the copy module terminating the first PPRC relationship on the second device, updating the device status of the first device to secondary, and replicating the copy device data to the first device.

2. The apparatus of claim 1, the copy module further copying the data from the second device to the copy device with the first device and the second device in a suspended first PPRC relationship, wherein changes to the data of the first device are not replicated to the second device and the second device has a device status of primary.

3. The apparatus of claim 1, wherein a copy relationship is established on the copy device and linked to the first PPRC relationship on the second device by creating a copy of the replication information from the second device on the copy device.

4. The apparatus of claim 3, wherein the copy module replicates the copy device data to the first device using an OR of replication information bitmaps on the copy and first devices.

5. A method for synchronizing replication status comprising:
   continuously replicating, by use of a processor, data from a first device designated with a device status of a primary to a second device designated with a device status of secondary, wherein a first peer-to-peer remote copy (PPRC) relationship is established between the first and second devices, the first and second devices storing replication information comprising a bitmap with a replication status for each data block of the first device;
   copying an instant point-in-time copy of the data from the second device to a copy device;
   copying the replication information from the second device to the copy device;
   creating a link between the replication information of the second device and the replication information of the copy device;
   in response to a failback command designating the copy device with a device status of primary and the first device with the device status of secondary, validating a new PPRC relationship by comparing the PPRC relationship replication status stored on the second device with the PPRC relationship replication status stored on the first device;
   terminating the first PPRC relationship on the second device;
   updating the device status of the first device to secondary; and
   replicating the copy device data to the first device.

6. The method of claim 5, wherein the data is copied from the second device to the copy device with the first device and the second device in a suspended first PPRC relationship, wherein changes to the data of the first device are not replicated to the second device.

7. The method of claim 5, wherein a copy relationship is established on the copy device and linked to the first PPRC relationship on the second device by creating a copy of the replication information from the second device on the copy device.

8. The method of claim 7, wherein the first PPRC relationship is maintained if the copy relationship on the copy device is terminated.

9. The method of claim 7,
   wherein the copy device data is replicated to the first device using an OR of replication information bitmaps on the copy and first devices.

10. The method of claim 7, further comprising
    in response to a failback command designating the first device with the device status of primary and the copy device with a device status of secondary, validating a new PPRC relationship by comparing the replication status stored on the first device with the PPRC relationship replication status stored on the second device;
    terminating the first PPRC relationship on the second device;
    updating the device status of the copy device to secondary; and
    replicating the first device data to the copy device using an OR of replication information bitmaps on the copy and first devices.

11. The method of claim 7, further comprising
    in response to a failback command designating the second device with the device status of primary and the first device with the device status of secondary, validating the first PPRC by comparing the replication status stored on the second device with the replication status stored on the first device;
    terminating the copy relationship on the copy device;
    updating the device status of the first device to secondary; and
    replicating the second device data to the first device using an OR of replication information bitmaps on the second and first devices.

12. The method of claim 7, further comprising
in response to a failback command designating the first device with the device status of primary and the second device with the device status of secondary, validating the first PPRC relationship by comparing the replication status stored on the first device with the replication status stored on the second device;
terminating the second PPRC relationship on the copy device;
updating the device status of the second device to secondary; and
replicating the first device data to the second device using the OR of replication information bitmaps on the second and first devices.

13. The method of claim 7, further comprising:
in response to receiving a withdraw command for the copy device, terminating the copy relationship if the copy of data on the second device is not completed by the withdraw command; and
in response to receiving the withdraw command, maintaining the copy relationship if the copy of data on the second device is completed by the withdraw command.

14. The method of claim 5, wherein the replicating of the data from the first device to the second device, the copying instant point-in-time copy of the data from the second device to the copy device, and the copying of the replication information from the second device to the copy device is performed in response to an atomic command.

15. The method of claim 7, wherein the copy relationship on the copy device is terminated if the first PPRC relationship on the second device is terminated.

16. A computer program product for synchronizing replication status, the computer program product comprising a computer readable storage medium having program code embodied therein, the program code readable/executable by a processor to perform:
continuously replicating data from a first device designated with a device status of primary to a second device designated with a device status of secondary, wherein a first peer-to-peer remote copy (PPRC) relationship is established between the first and second devices, the first and second devices storing replication information comprising a bitmap with a replication status for each data block of the first device;
copying an instant point-in-time copy of the data from the second device to a copy device;
copying the replication information from the second device to the copy device;
creating a link between the replication information of the second device and the replication information of the copy device;
in response to a failback command designating the copy device with a device status of primary and the first device with the device status of secondary, validating a new PPRC relationship by comparing the PPRC relationship replication status stored on the second device with the PPRC relationship replication status stored on the first device;
terminating the first PPRC relationship on the second device;
updating the device status of the first device to secondary; and
replicating the copy device data to the first device.

17. The computer program product of claim 16, wherein the data is copied from the second device to the copy device with the first device and the second device in a suspended first PPRC relationship, wherein changes to the data of the first device are not replicated to the second device.

18. The computer program product of claim 16, wherein a copy relationship is established on the copy device and linked to the first PPRC relationship on the second device by creating a copy of the replication information from the second device on the copy device.

19. The computer program product of claim 18,
wherein the copy device data is replicated to the first device using an OR of replication information bitmaps on the copy and first devices.

20. A method for deploying a computer program product, comprising integrating program code into a computing system, wherein the code in combination with the computing system performs the following:
continuously replicating data from a first device designated with a device status of a primary to a second device designated with a device status of secondary, wherein a first peer-to-peer remote copy (PPRC) relationship is established between the first and second devices, the first and second devices storing replication information comprising a bitmap with a replication status for each data block of the first device;
copying an instant point-in-time copy of the data from the second device to a copy device;
copying the replication information from the second device to the copy device;
creating a link between the replication information of the second device and the replication information of the copy device;
in response to a failback command designating the copy device with a device status of primary and the first device with the device status of secondary, validating a new PPRC relationship by comparing the PPRC relationship replication status stored on the second device with the PPRC relationship replication status stored on the first device;
terminating the first PPRC relationship on the second device;
updating the device status of the first device to secondary; and
replicating the copy device data to the first device.

* * * * *